United States Patent [19]

Milovich et al.

[11] Patent Number: 5,073,589
[45] Date of Patent: Dec. 17, 1991

[54] COMPOSITE BACKING STRUCTURE FOR SPRAY METAL TOOLING

[76] Inventors: Dimitrije Milovich, 1611 S. 1600 East, Salt Lake City, Utah 84105; Ronald H. Nelson, 2154 S. 1900 East, Salt Lake City, Utah 84106

[21] Appl. No.: 454,511

[22] Filed: Dec. 21, 1989

[51] Int. Cl.⁵ .................. C08K 3/08; C08K 3/04
[52] U.S. Cl. .................. 524/439; 524/441; 524/495; 524/496
[58] Field of Search ............. 524/496, 439, 441, 495

[56] References Cited

U.S. PATENT DOCUMENTS

| | | | |
|---|---|---|---|
| 4,339,374 | 7/1982 | Olschewski et al. | 524/496 |
| 4,451,590 | 5/1984 | Fujimaki et al. | 524/496 |
| 4,544,700 | 10/1985 | Wright | 524/496 |
| 4,557,859 | 12/1985 | Maeda et al. | 524/496 |
| 4,569,786 | 2/1986 | Deguchi | 524/496 |
| 4,777,204 | 10/1988 | Ikenaga | 524/439 |
| 4,812,247 | 3/1989 | Fahner et al. | 524/496 |

OTHER PUBLICATIONS

TAFA ® Application for the TAFITE 4321 Backup Resin.

Primary Examiner—Kriellion S. Morgan
Assistant Examiner—Peter Szekely
Attorney, Agent, or Firm—M. Reid Russell

[57] ABSTRACT

The present invention is in a material for forming a backing for a thin metal shell of a metal-faced composite tool that is for use in manufacture of structural components utilizing advanced composites. The backing is a mix of a selected resin for providing support as to tool backing at its operating temperatures and pressures; and a mix of very small, larger low, and large higher aspect fibers that are combined to form a lattice. Which fibers, prior to combining with the resin, are treated for chemical adhesion. The fibers receive a volume of resin mixed therein sufficient to provide a strong bonding to and between the fibers. The cured backing to have a minimum density, exhibit low isotropic shrinkage during fabrication, with a low isotropic expansion at operating from room or atmospheric temperature to temperatures of from 350° F. to 750° F., and will exhibit good thermal conductivity and dimensional stability.

5 Claims, 3 Drawing Sheets

COMPOSITE BACKING STRUCTURE FOR SPRAY METAL TOOLING

BACKGROUND OF THE INVENTION

1. Field of the Invention

The invention relates to metal-faced composite tooling, and more particularly to composite backup structures supporting a thermally-sprayed metal shell.

2. Historical Perspective

The design and fabrication of tooling used for the fabrication of advanced composite components forms one segment of the advanced composite structure industry. "Tooling" refers to the mold that forms the composite. Advanced composites are typically defined as thermosetting or thermoplastic matrix materials containing a high content of high strength, continuous, reinforcing fibers such as carbon, graphite, kevlar, or fiberglass. Advanced composites typically are used in high performance structural applications because of their higher specific strength and stiffness as compared to earlier composite materials. Advanced composite structures are generally more expensive than structures constructed of traditional metals such as aluminum or steel. A majority of this cost disadvantage is due to the cost of tooling and processing. The present invention overcomes this disadvantage by providing tooling for fabrication of composite products that is of lower cost, lighter in weight, and available in less time, thereby allowing the industry to provide products at a lower cost. It also reduces the expense and long lead times of product development programs.

There are two basic processes for constructing tooling for composites manufacturing. One method is hard metal tooling. This method consists of directly fabricating or machining the final tool from the tool drawing. The second method relies on the construction of intermediate models or patterns of the part for which the tooling is being constructed. Typically a plastic, wood or plaster model of the final part is constructed from part drawings. Such original model is referred to as the master pattern. Metal-faced composite tooling, also known as spray metal tooling, is made from a thin metal shell formed by spraying the metal on the master pattern, which metal shell or master pattern is then suitably reinforced and removed to be used a mold.

The present invention presents a new design of high performance composite as a backing structure for such thin metal shell that is capable of maintaining mold stability during fabrication and the mold's subsequent use when it is subjected to high temperatures and compaction pressures as are experienced during the molding of advanced composite structural components.

3. Prior Art

Spray metal tooling technology was introduced some forty years ago. Recently, however, with an increasing interest and utilization of advanced composite structural components, it has become increasingly important to provide tooling that will be stable, that will not distort or significantly deform, over a number of applications of high heat and pressure. Specifically, prior to the present invention, it has not been possible to provide, in a mold backing, for mold stability at temperatures of up to 750° F. and compaction pressures as high as 1500 psi, that are or may be required for processing advanced composites.

A U.S. Pat. No. 3,533,271, to Walkey, illustrates an early approach to a die fabricated by spray metal techniques. This patent shows filling a die shell with a binder that solidifies as a tool backing. It also teaches forming a backing material from combinations of: an epoxy resin and shot; a mix of iron shot and sodium silicate, melted to form a glass like material; epoxy impregnated glass fibers; and aluminum and plastic. All of which materials, except for the sodium silicate and shot composite, have been limited to use with tooling that operates at temperatures at or below 250° F. A sodium silicate and shot mix has been used at temperatures of approximately 1450° F., that exhibited greatly different coefficients of thermal expansion of the two materials. Accordingly, with only a few cycles of heating and cooling, the materials will have separated, thereby compromising the backing material's structural integrity. At temperatures of 350° to 750° F. and pressures of up to 1500 psi, as are or may be required for molding or laminating advanced or high performance composites, such as epoxy, bismaleimide, polyamide and thermoplastics, earlier backing or reinforcing materials have quickly failed, due to thermal stresses as occur in repeated thermal cycling.

The present invention provides, through a utilization of treated small, short and long fibers in an appropriate resin mix a backing structure that is strong and stable. Which backing structure will exhibit a low coefficient of thermal expansion at temperatures of from 70° F. to 750° F. and compaction pressures of up to 1500 psi and good characteristics of thermal diffusivity and low density. Additionally, the backing material of the present invention will exhibit minimal linear shrinkage of only 0.025% to 0.05% in both formation and with heating and cooling, as compared to approximately 1-1.5% for resin alone.

It is, of course, known that short fibers, sometimes referred to as whiskers, microfibers, mineral fibers, chopped fibers, milled fibers, short metal and metal coated fibers, that are from submicron to 7 to 13 microns in diameter, will exhibit high mechanical properties to a mold and will increase the stiffness of a resin. Such mix is known to produce a composite having a greater strength than does a neat resin composite. However, such composites have high density, poor thermal conductivity, and exhibit unacceptable shrinkage during fabrication. Papers given by John V. Milewski entitled "How to Use Short Fiber Reinforcements Efficiently" and "Problems and Solutions in Using Short Fiber Reinforcements" to the 37th Annual Conference, Reinforced Plastics/Composites Industry, The Society of the Plastics Industry, Inc., Jan. 11-15, 1982, summarize the characteristics, uses and limitations of short fibers in resin composites.

Distinct from the earlier composites, the present invention, utilizes a mix of small, short and long fibers, that are treated for improved resin wetting, thereby reducing initial shrinkage, and producing a tool backing having a high flexural strength with a small coefficient of thermal expansion, good thermal diffusivity, and low density.

SUMMARY OF THE INVENTION

It is a principal object of the present invention to provide a backing material that is suitable for use as a backing for metal-faced composite tooling for use in a manufacture of high performance composite structural components.

Another object of the present invention is to provide a backing material that will maintain dimensional stability when the tool is cycled from room temperature to operating temperatures and compaction pressures of from 350° F. to 750° F. and up to 1500 psi over a number of repetitions.

Another object of the present invention is to provide a backing material that will exhibit a low coefficient of thermal expansion during cyclic operations from room temperature to operating temperatures of 350° F. to 750° F.

Another object of the present invention is to provide a backing material that will exhibit high thermal diffusivity.

Another object is to provide a backing material that is generally of lesser density as compared to one formed of neat or filled resin.

Still another object of the present invention is to provide a backing material that is a composite of small, short and longer fibers that are treated for chemical adhesion, improving bonding and for lowering the resin content so as to decrease initial shrinkage and to provide a mix having a low coefficient of thermal expansion, the composite for pouring into and hardening as a backing for a thin shell metal-faced tool.

Still another object of the present invention is to provide a process for forming a backing structure for a thin shell metal-faced tool that is for use in the manufacture of high performance composites, which tool including the backing structure of the present invention will maintain stability over a number of molding cycles to temperatures of 350° F. to 750° F. and structural loads of up to 1500 psi compaction pressure.

The present invention is in a backing material and process for its incorporation into metal-faced composite tooling suitable for use in the manufacture of high performance composites and other plastics. Where, in that manufacture, the tooling will be subjected to repetitions of heating to maximum temperatures varying from 350° F. to 750° F. and compaction pressures of up to 1500 psi. The backing material of the present invention to both support and adhere to the thin metal shell surface. In operation the backing material of the present invention exhibits good strength characteristics, with relatively low initial mold fabrication shrinkage, a low coefficient of thermal expansion, and will readily diffuse heat therethrough. The present invention teaches a backing that is produced by a selection of a suitable resin, wherein is mixed, a selection of a combination of small, low aspect or short, and higher aspect, or long, fibers. The fibers are treated, preferably by either an acid or alkaline etching process, for promoting better adhesion with the resin so as to provide an intimate contact during polymerization when the liquid resin changes to a solid.

BRIEF DESCRIPTION OF THE DRAWINGS

These and other objects and features of the present invention will become more apparent from the following description in which the invention is described in detail in conjunction with the accompanying drawings.

DETAILED DESCRIPTION

Spray metal tooling has heretofore been manufactured by spraying of a hot metal onto a master pattern. Such finished tooling has, however, not been practical for use in the fabrication of advanced composite structural components that involve cyclically raising the tool temperature from room or ambient temperature to temperatures above 350° F. and back to room temperature. During which operations the tool also experiences high compaction pressures. Such advanced composite materials, for example, include epoxy, bismaleimide, polyamide and thermoplastic matrix composites. Which manufacture require that the tooling used to form such advanced composites into structural components be stable at temperatures of up to 750° F. and under high compaction pressures.

The present invention, by a selection of constituents of a backing material, provides for filling the interior of a thin walled metal shell with a backing material that will support the tool face over a number of tool use cycles. The thermal expansion of which backing material is also selected to have a low coefficient of thermal expansion to vary minimally from that of the spray metal shell, precluding cracking of the shell as could cause splitting of that shell off of the backing. The backing material further to exhibit minimal shrinkage during both resin polymerization and during tool use cycles.

Figure 1:
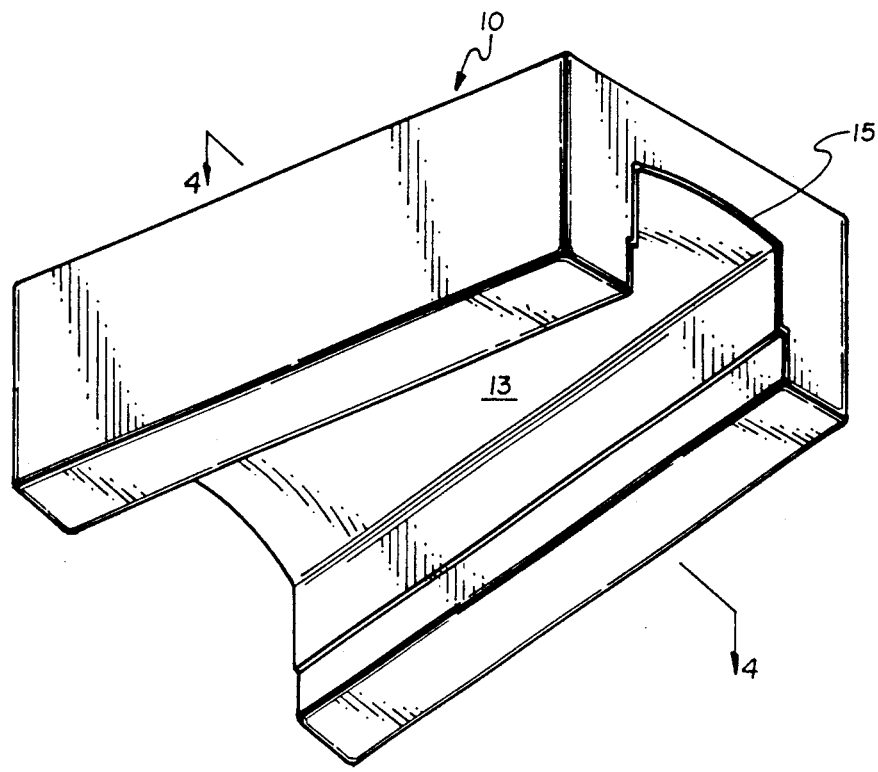
FIG. 1 is a perspective view of a metal-faced composite tool that includes a backing manufactured in accordance with the invention.

FIG. 1 illustrates, as a perspective view, a female spray metal tool 10, hereinafter referred to as tool. The tool is for forming, as a structural component, a support channel type rib for an aircraft control surface that is manufactured from an advanced composite material.

Figure 2:
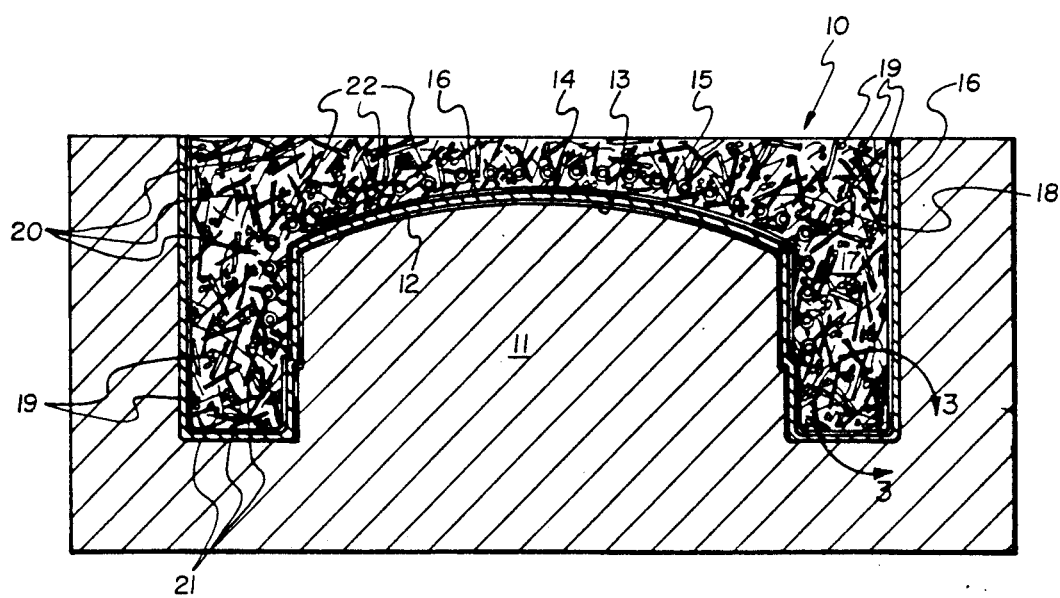
FIG. 2 is a lateral section taken through a master pattern showing a thin wall metal tool face sprayed thereon and includes the backing material containing heat rods fitted through the tool.

FIG. 2 shows a lateral cross-section of the tool 10 fabricated on a master pattern 11. Master pattern 11 has a top surface 12 that is dimensionally contoured to a desired configuration and smoothness that is reproduced as a mold cavity 13 of tool 10 of FIG. 1. Which master pattern 11 is preferably formed from plastic, plaster, wood or metal and is removed after tool 10 fabrication is complete. In that fabrication, the master pattern surface 12 is first coated with a thin layer 14 of a parting agent that adheres thereto and, during thermal spraying, is to prevent lifting of the sprayed metal, and to allow release of the formed thin metal shell. In practice, a parting agent may be applied in a suitable fashion, such as by spraying. Polyvinylacetate, polyvinylchloride and paraffin wax, are examples of parting agents that have been utilized successfully in a practice of the invention.

The mold cavity surface 13 is, of course, initially transferred thereon by spraying a molten powder of a select metal onto release layer 14 on the master pattern surface 12, metallizing that surface. With continued spraying a thin wall metal shell 15 is built up on that master pattern surface 12. The surface of which thin wall metal shell is, of course, the tool cavity surface, 13 and is an exact mirror image replication of the master pattern surface 12. In practice, metals such as tin, zinc, aluminum, and steel alloys, and the like, can be used as the metal spray.

With the master pattern surface 12 coated with parting agent, and after application of the metal spray thereto, the metal shell 15 is coated with a fiber reinforced resinous paste mixture that forms an adhesive layer 16 to the metal shell 15 and to a backing 17. The adhesive layer 16 is of a strength, thickness and substance to afford a reinforcement to and is compatible to the metal shell. The adhesive layer 16 can be oven or air cured, depending upon the nature of the tool being fabricated and metal spray material being used.

Similar to earlier tooling, the fabrication of a thin walled metal shell of the composite tooling of the present invention preferably involves atomizing metals in wire or powder form by means of an electric arc, gaseous flame, or plasma jet, or electroformed nickel and simultaneously depositing the metal particles onto the master pattern surface 12 as shell 15. For forming an appropriate thin walled metal shell 15, the metal is sprayed thereon to a thickness of between 0.030 and 0.250 inches. For a tool 10 having the capabilities set out hereinabove, an aluminum metal was sprayed to a thickness of approximately 0.090 inches.

The thin walled metal shell is generally not removed from the master pattern 11 for filling with a backing material. Preferably, the backing material is added within the thin walled metal shell while it is mounted to the master pattern, as illustrated in FIG. 2.

FIGS. 2 through 5 show a preferred backing 17 of the present invention. Backing 17 is a mix of a selected resin and fiber fillers selected to provide characteristics of: strength; low shrinkage during fabrication; exhibits predictable and preferably low isotropic thermal expansion during heating and cooling (isotropic being defined as exhibiting stability, no movement in all directions, low isotropic meaning little to essentially no movement of the polymerized materials); good thermal conductivity; good dimensional stability, (no warping or size change); low density and reasonable cost. The thermal expansion properties of such backing are of great significance relative to the useful life of the tool.

Should the relative thermal expansion properties of the thin metal shell and the backing be different, then a separation of the layers would likely take place when the tool is subjected to repetitions of being heated and cooled. Accordingly, the backing 17 should be essentially isotropic to avoid induced warpage due to differences in the coefficients of expansion of the materials. Further, for sequential application of compressive loading to the tool face, at operating temperatures of from 350° F. to 750° F., the backing must exhibit stiffness and strength, and resist deformity as would distort the composite part being molded that could fracture the tool at the boundary of the thin metal shell 15 with the backing 17. Such isotropic and strength properties relate to the resin selection and to the particular constituents mixed therein. Thermoset organic and inorganic resins, as are used to produce the present invention, are shown in FIGS. 2 through 5 as open areas 18. These resins also function as adhesives to bond the various fillers and fibers to each other and to the thin walled metal tool shell. Resins, when polymerized, bind to the fillers and fibers and create a basic homogeneous backup that is also capable of transferring mechanical and thermal loads throughout that structure.

There are several characteristics that a resin must have in order to be useful as a tool backing. Resins must provide chemical adhesion to the surfaces of the materials, promoting intimate contact between the resin and filler or fiber on the molecular level. A resin undergoes a polymerization (in the case of organic resins) from a liquid state to a solid state. In the solid state, the resin must maintain useful strength and stiffness at the anticipated operating temperatures in order for the composite structure to perform as a whole. The upper temperature limit of usefulness of any composite, and therefore the backing structure, is directly dependant on the stiffness and strength of the resin at that temperature. Which upper limit is frequently defined with respect to the "glass transition temperature" or "$T_g$" of the resin. The following are examples of preferred resins that can be used to fabricate the tool 10. A particular resin is selected based upon the anticipated tool operating temperature:

| Resin | °F. |
|---|---|
| Polyester | 150–250 |
| Epoxy | 350–450 |
| Bismaleimide | 450–600 |
| Polyamide | 600–750 |

The above sets out the approximate upper operating temperature of the tool 10. With a use of selected fillers and fibers, hereinafter referred to as fibers, the combination of resin and fibers will provide a backing that has enhanced strength, good thermal diffusity, exhibits minimum thermal expansion, and has low density as compared to earlier composites. Specifically, the backing of the present invention preferably utilizes several types of fibers for reinforcement and for the useful properties they lend to the composite backing material. The preferred fibers are characterized by their aspect ratio. Aspect ratio is the ratio of the length to the average diameter of a single reinforcement and is also called L/D or L to D ratio. Fillers with a 1 to 1 aspect ratio are usually spherical or cubic.

Fibers were found to contribute improvements to the neat resin as follows:

Very small fibers 19, shown essentially as spheres, egg shaped, and the like, in FIGS. 2 through 5 and in Examples 2 and 3, are on the order of 7–13 microns in diameter, with lengths of 50 to 200 microns, and acted primarily as resin modifiers, increasing the stiffness of the resin. Thereby significantly increasing the overall composition strength (some two to four times over neat resin compositions). Such fibers have aspect ratios ranging of from 10 to 20.

Larger low (2–5) aspect ratio fibers 20, shown as short fibers in FIGS. 2 through 5, include aluminum fibers having diameters of 0.010 to 0.060 inches with lengths of 0.050 to 0.150 are shown in Examples 1 through 3, hereinbelow. These fibers were included as basic space fillers to provide good thermal conductivity, machinability to the composition, to replace a large quantity of the resin, and for achieving higher compression strength. With their use, the overall shrinkage and thermal expansion of the composite was found to be significantly lower than earlier composites, approximately 0.025% linearly for aluminum fibers.

Large higher aspect ratio fibers are shown as long fibers in FIGS. 2 through 5 and in Example 3, and have diameters of 0.005 to 0.060 and aspects of 15 to 1 through 125 to 1. These longer fibers 21 provide critical high temperature strength as well as greatly improved thermal conductivity. They transfer loads across numerous small and short fibers 19 and 20, thus rigidizing the overall composite at higher temperatures. The combination of the select resin with the selected fibers 19, 20 and 21 that is essentially the backing 18 of FIGS. 2 through 5, minimizes resin content so as to produce a lower density backing (25-75 pounds per cubic foot), thereby reducing both the cost and weight of that backing 17, and increasing thermal diffusivity through reduced mass. Improved thermal conductivity is provided with high aspect ratio fibers (greater than 30), the long fibers producing a close packed lattice structure to transfer loads therethrough as well as to provide good thermal conductivity.

As set out above, the respective long fibers 21 present a lattice that also includes small and short fibers 19 and 20, whereto the selected resin adheres and binds to. A three dimensional representation of that mix is shown as a cube in FIG. 5. To further enhance resin adhesion with the individual fiber surfaces, for enhancing intimate contact, and chemical bonding, the fibers are preferably treated. Such treatment includes the removal of surface deposits and is to create pitting that the resin will flow into and provide mechanical and chemical adhesion with. Such treatment can consist of an acid or alkaline etch, or the like, as set out in the examples included herein below.

Figure 4:
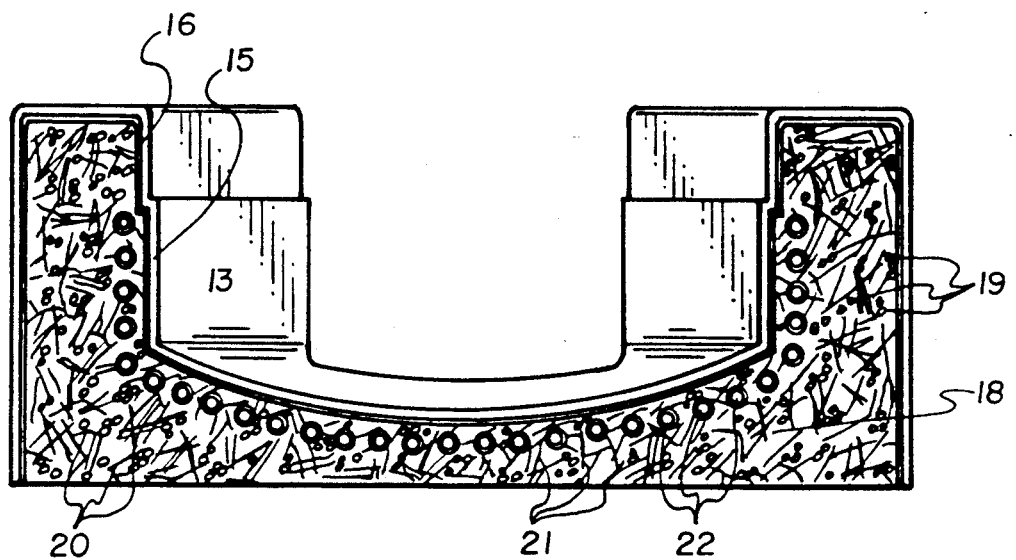
FIG. 4 is a lateral sectional view taken along the line 4—4 of FIG. 1.
Figure 3:
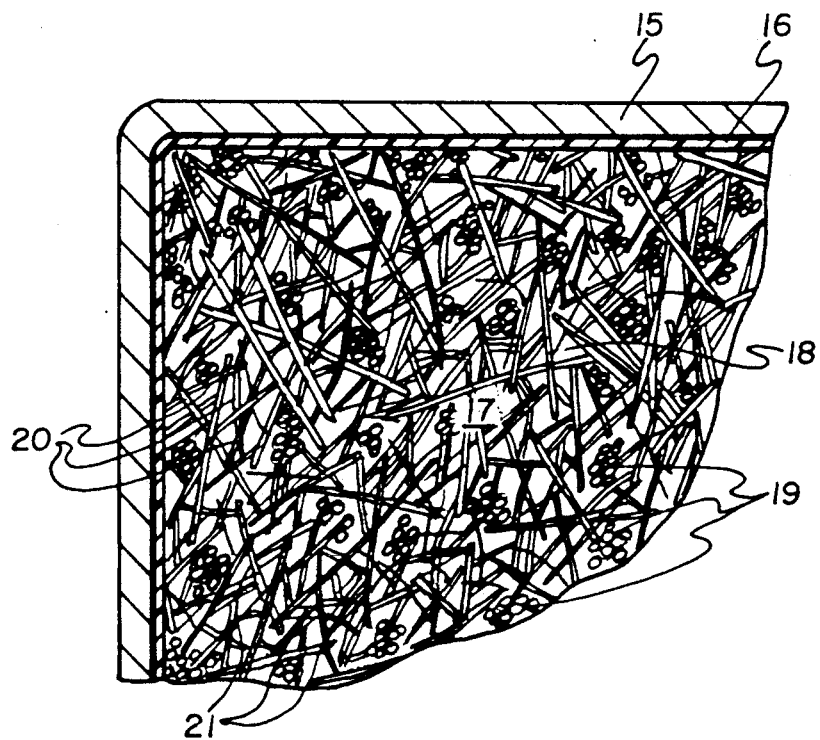
FIG. 3 is a sectional view taken within the line 3—3 of FIG. 2.
Figure 5:
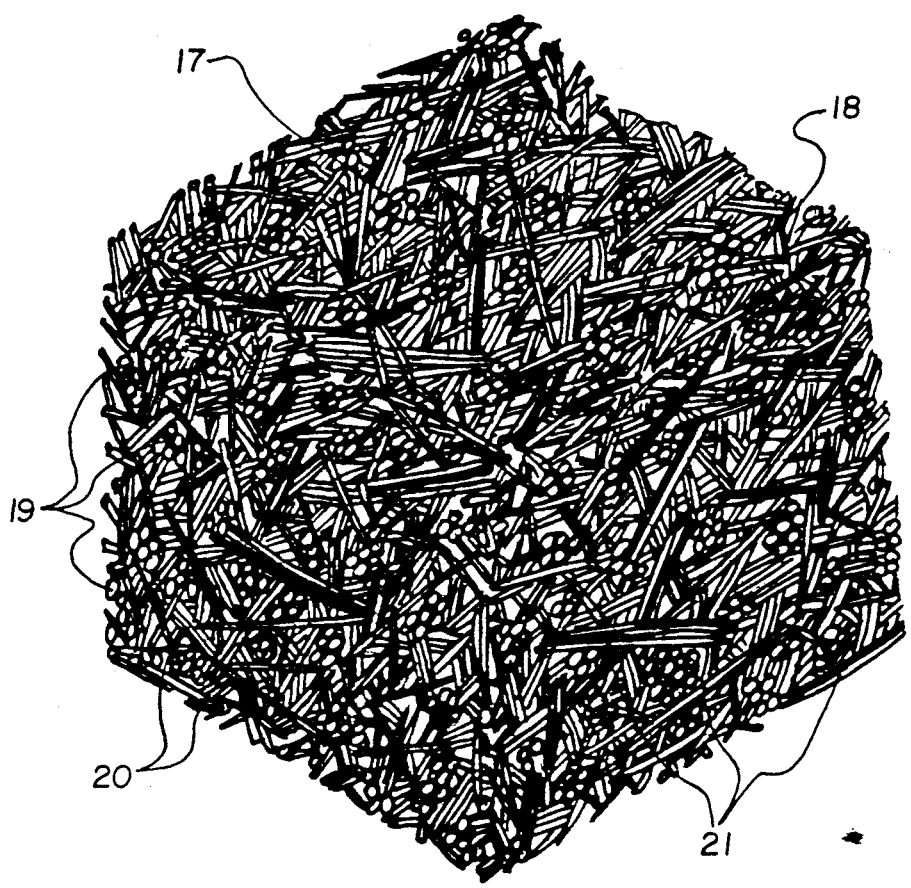
FIG. 5, is an enlarged perspective view of the section of backing material of FIG. 3 is shown as a cube without the metal shell.

Shown in FIGS. 2 and 4, the tool 10 also preferably includes heating tubes 22 installed at spaced intervals therein adjacent to the pattern cavity 13. Tubes 22 can be open, as shown to circulate a heated fluid therethrough, or can contain electrical heating elements. The tubes 22 are included to provide for heating of tool 10 from the inside out, the heat conducted through backing 17 to the tool face. Further, the tool 10 can be heated within an oven, or the like, within the scope of this disclosure.

Hereinbelow are set out examples of the unique materials combination capability as compared to an industry standard:

NOTES TO EXAMPLES:

1. Contribution of Constituent Materials 1.1 Resin or other binders (organic or inorganic)

Thermoset organic resins such as epoxies are the adhesives which bond the various filers and fibers together to each other and to the metal tool shell. Resins bind the materials together in order to create the basic homogeneous backup and also transfer mechanical and thermal loads throughout the backup structure. There are several characteristics a resin must have in order to be useful. Resins must "wet" the surfaces of the materials, promoting intimate contact of the resin and the filler on the molecular level; they must then undergo a polymerization (in the case of organic resins) from a liquid state to a solid state; and they must maintain useful strength and stiffness in the solid state at the anticipated use temperature in order for their composite structure to perform as a whole. The upper temperature limit of usefulness of any composite is directly dependant on the stiffness and strength of the resin at that temperature. This upper limit is frequently defined with respect to the "glass transition temperature", or "$T_g$", of the resin. The following list will give some idea of the $T_g$ of various resins:

| Resin | $T_g$ (f) |
| --- | --- |
| Polyester | 150-250 |

| Resin | $T_g$ (f) |
| --- | --- |
| Epoxy | 350-450 |
| Bismaleimide | 450-600 |
| Polyamide | 600-750 |

1.2 Fillers and reinforcements

There are several types of fillers/reinforcements that provided useful properties, They are characterized by their aspect ratio, where aspect ratio is the ratio of the length to the average diameter of a single reinforcement. Also called L/D or L to D ratio. Fillers with 1 to 1 aspect ratio are usually spherical or cubic.

For the purposes of the present application, all such materials will simply be called "fibers". Fibers were found to contribute improvements in several manners:

1) Very small fibers, or microfibers, on the order of 7-13 microns in diameter, with lengths of 50 to 200 microns and aspect ratios ranged from 10 to 20, acted primarily as resin modifiers, increasing the stiffness of the resin, that, in turn, increased the overall composition strength significantly (some two to four times over neat resin compositions).

2) Larger low (2-5) aspect ratio fibers, such as the aluminum fibers were used in examples having diameters of 0.010 to 0.60 inches with lengths of 0.050 to 0.150. These fibers are useful as basic space fillers and have good thermal conductivity, provide machinability to the composition, and, because they replaced a large quantity of the resin, the overall shrinkage and thermal expansion of the composition was significantly lower. (New shrinkage vs. old: 0.025% vs. 0.5-2%, new coefficient of thermal expansion, CTE, vs. old: 13.5 vs. 35-40 micro-inches/inch/degree F.)

3) Large higher aspect ratio fibers, with diameters of 0.005-0.0060 and aspects of 15 to 1 through 125 to 1, provide critical high temperature strength as well as improved thermal conductivity. They apparently transfer loads across numerous larger fibers, thus rigidizing the overall structure at higher temperatures.

The Examples below show that very useful compositions can be made using just these fibers to improve resin properties. Such composites are capable of producing lower density aggregates (25-75 pounds per cubic foot) that use less resin to hold them together, thereby reducing both cost and weight.

Improved thermal conductivity with high aspect ratio fibers (greater than 30) have also been documented in filled injection molded plastics.

2.0 Basic Backup Material Design Approach

There are several key requirements for tooling materials of the present invention:

1) low, isotropic (uniform in all directions) initial shrinkage during fabrication;

2) predictable, preferably low, isotropic thermal expansion during heating and cooling;

3) good thermal conductivity;

4) good dimension stability at the end-use temperature, i.e. no warping or size change; and 5) reasonable cost.

Since isotropic properties are important considerations, and because conventional laminated tooling will change shape with temperature due to its laminated vs. isotropic nature, (this is a real yet little understood phenomena), accordingly a first objective is to provide tooling backup materials that are isotropic.

Next, since neat epoxy or other resin has high shrinkage (3–5%), high thermal expansion, and is a thermal insulator, the second objective is: to use as little resin as possible in holding the whole backing together.

Also, it was determined that high aspect ratio fibers have good conductivity and high stiffness (which control overall strength, stiffness and thermal expansion), and accordingly, it was determined to use high aspect ratio fibers of low thermal expansion materials so as to provide conductivity, low thermal expansion, and high temperature strength. Summarizing, the higher the aspect ratio, the lower the density.

EXAMPLE 1

| Material | % Composition by Weight |
|---|---|
| 1. Aluminum fiber | 100 parts |
| diameter: .010–.060 inches | |
| aspect ratio: 2–5 | |
| ("325X Aluminum granule", | |
| Reynolds Aluminum, Louisville, | |
| Kentucky, or equivalent) | |
| Aluminum treated and etched as follows: | |
| 1. Degreased with trichloroethylene | |
| 2. Immersed for 20 minutes 155° F. in a bath composed of (by weight): | |
| Distilled water-30 parts | |
| Sulfuric Acid concentrated 96%-10 parts | |
| Sodium Dichromate-1 part | |
| 3. Rinsed thoroughly in running distilled or deionized water | |
| 4. Oven dried at 150° for 10 minutes | |
| 2. Epoxy Resin | 13 parts |
| 350°–400° Service Temperature | |
| cured at 200° F. 2 hours | |
| +250° F. 1 hour | |
| +300° F. 1 hour | |
| +350° F. 2 hours | |
| ("FR 52 A/C", Fiberesin Corporation Burbank, California, or equivalent | |
| | 114 parts Total |

EXAMPLE 2

| Material | % Composition by Weight |
|---|---|
| 1. Aluminum fiber | 100 parts |
| diameter: .010–.060 inches | |
| aspect ratio: 2–5 | |
| ("325X Aluminum granule", | |
| Reynolds Aluminum, Louisville, | |
| Kentucky, or equivalent) | |
| Aluminum treated and etched as follows: | |
| 1. Degreased with trichloroethylene | |
| 2. Immersed for 20 minutes 155° F. in a bath composed of (by weight): | |
| Distilled water-30 parts | |
| Sulfuric Acid concentrated 96%-10 parts | |
| Sodium Dichromate-1 part | |
| 3. Rinsed thoroughly in running distilled or deionized water | |
| 4. Oven dried at 150° for 10 minutes | |
| 2. Carbon Microfiber | 5 parts |
| diameter .00028 inches | |
| aspect ratio: 10–30 | |
| ("Fortafil 5c", Great Lakes Carbon, Rockwood, Tennessee, or equivalent) | |
| 3. Epoxy Resin | 19.5 parts |
| 350°–400° Service Temperature | |
| cured at 200° F. 2 hours | |
| +250° F. 1 hour | |
| +300° F. 1 hour | |
| +350° F. 2 hours | |
| ("FR 52 A/C", Fiberesin Corporation Burbank, California, or equivalent | |
| | 124.5 parts Total |

EXAMPLE 3

| Material | % Composition by Weight |
|---|---|
| 1. Aluminum fiber | 100 parts |
| diameter: .010–.060 inches | |
| aspect ratio: 2–5 | |
| ("325X Aluminum granule", | |
| Reynolds Aluminum, Louisville, | |
| Kentucky, or equivalent) | |
| Aluminum treated and etched as follows: | |
| 1. Degreased with trichloroethylene | |
| 2. Immersed for 20 minutes 155° F. in a bath composed of (by weight): | |
| Distilled water-30 parts | |
| Sulfuric Acid concentrated 96%-10 parts | |
| Sodium Dichromate-1 part | |
| 3. Rinsed thoroughly in running distilled or deionized water | |
| 4. Oven dried at 150° for 10 minutes | |
| 2. Brass-plated carbon steel wires | 48.6 parts |
| diameter: .016 inches | |
| aspect ratio: 45–50 | |
| Brass-plated wires treated as follows: | |
| 1. Degreased with trichloroethylene | |
| 2. Etched at 160° F. for 15 minutes in a bath composed of (by weight): | |
| Distilled water-138 parts | |
| Sodium Metasilicate-3 parts | |
| Tetrasodium Pyrosulfate-1.5 parts | |
| Sodium Hydroxide-1.5 parts | |
| Sufactant (Nacconol ®  or equivalent) 0 0.5 parts | |
| 3. Rinsed thoroughly in running tap water and then in distilled or deionized cold water | |
| 4. Oven dried at 200° F. | |
| 3. Carbon Microfiber | 4.1 parts |
| diameter .00052 inches | |
| aspect ratio: 10–20 | |
| ("VME milled fiber" AMOCO, Ridgefield, Connecticut, or equivalent) | |
| 3. Bismaleimide Resin | 26 parts |
| cured at 375° F. 2 hours | |
| +410° F. 5 hours | |
| +480° F. 5 hours | |
| ("Compimide 796", Shell Chemical, Houston, TX, or equivalent) | |
| Burbank, California, or equivalent | |
| | 178.7 parts Total |

COMPARISON MATERIAL

TAFITE 4321 TM Backup Resin set out below is sold by TAFA, Inc., of Bow, N.H., a leading supplier of spray metal equipment and backing materials for spray metal tooling. According to TAFA technical bulletin 2.5,4.2.2, the resin is ". . . based on methacrylates and monostyrene . . . and can be highly filled with aluminum powder and grain." The resin is sold with appropriate amounts of aluminum powder and grain and TAFA recommends usage of this formulation as a backup material for various types of molds and tooling.

The TAFITE 4321 TM formulation was supplied in pre-cast, cured bars ready for testing for Coefficient of Thermal Expansion and flexural strength at elevated temperatures. The table below shows the CTE between room temperature and elevated flexural strength temperature and flexural strength of Examples 1 through 3 as well as for the TAFITE 4321 TM.

| Material | CTE (in × $10^{-6}$/inF.°) | Flexural Strength | Temperature Tested |
| --- | --- | --- | --- |
| Example 1 | 16.01 | 1349 psi | 355 F.° |
| Example 2 | 15.2 | 2386 psi | 328 F.° |
| Example 3 | 7.54 | 1105 psi | 575% F.° |
| TAFITE 4321 ® | 18.04 | deforms plasticly (cannot support loads) @250 F.° | |

While preferred embodiments of the present invention in a backing for a metal-faced composite tool and its process of manufacture have been shown and described herein, it should be understood that the present disclosure is made by way of example only and that variations are possible without departing from the subject matter and reasonable equivalency thereof, coming within the scope of the following claims, which claims we regard as our invention.

We claim:

1. A backing material for a thin metal-faced composite tool comprising, a thermoset resin selected as a backing for a thin metal-faced composite tool at its anticipated operating temperature and pressure; and a mix of very small and larger low aspect fibers that have been chemically treated by an acid or alkaline etch, to clean and pit the surfaces thereof are combined with said resin, where the ratio of said resin to fibers is from five percent (5%) to forty-five percent (45%) with a density of fifteen (15) lbs/ft$^3$ to one hundred fifty (150) lbs/ft$^3$, and the mix is poured into a thin metal shell, said resin polymerizing therein to form said backing for said thin metal-faced composite tool that is isotropic and exhibits a low coefficient of thermal expansion.

2. A backing material as recited in claim 1, further including in the mix of fibers large higher aspect fibers with the mix of very small and larger low aspect fibers.

3. A backing material as recited in claim 2, wherein the relationship of the mix of fibers is by weight 0% to 30% very small fibers, 20% to 100% larger low aspect fibers, and 0% to 95% large higher aspect fibers.

4. A backing material as recited in claim 2, wherein the very small fibers are carbon, the larger low aspect fibers are aluminum, and the large higher aspect fibers are brass-plated carbon steel.

5. A backing material as recited in claim 1, wherein the particular thermoset resin is selected for its glass transition temperature ($T_g$) that is the upper temperature limit whereat said thermoset resin will retain its design stiffness and strength.

* * * * *